(12) United States Patent
Berner

(10) Patent No.: US 10,272,435 B2
(45) Date of Patent: Apr. 30, 2019

(54) SAMPLE CONTAINER WITH SEALING FUNCTION

(71) Applicant: PRIONICS AG, Carlsbad, CA (US)

(72) Inventor: Alexander Berner, Dachau (DE)

(73) Assignee: PRIONICS AG, Zurich (CH)

( * ) Notice: Subject to any disclaimer, the term of this patent is extended or adjusted under 35 U.S.C. 154(b) by 24 days.

(21) Appl. No.: 15/311,019

(22) PCT Filed: May 20, 2015

(86) PCT No.: PCT/EP2015/001025
§ 371 (c)(1),
(2) Date: Nov. 14, 2016

(87) PCT Pub. No.: WO2015/176815
PCT Pub. Date: Nov. 26, 2015

(65) Prior Publication Data
US 2017/0106365 A1    Apr. 20, 2017

(30) Foreign Application Priority Data

May 22, 2014  (DE) .................. 10 2014 007 410

(51) Int. Cl.
G01N 1/00      (2006.01)
B01L 3/00      (2006.01)
A01K 11/00     (2006.01)

(52) U.S. Cl.
CPC ........ *B01L 3/50825* (2013.01); *A01K 11/003* (2013.01); *B01L 3/502* (2013.01);
(Continued)

(58) Field of Classification Search
CPC ...................................................... B01L 3/502
See application file for complete search history.

(56) References Cited

U.S. PATENT DOCUMENTS 4,678,559 A * 7/1987 Szabados ................. G01N 1/28
209/17
2008/0064983 A1   3/2008 Stromberg et al.

FOREIGN PATENT DOCUMENTS

DE    102012023493    2/2014
EP    1920651 A1  *  5/2008  ........... A01K 11/003
(Continued)

OTHER PUBLICATIONS

PCT/EP2015/001025, International Preliminary Report on Patentabilitiy dated Nov. 22, 2016, 1-6.
(Continued)

Primary Examiner — Jyoti Nagpaul

(57) ABSTRACT

The present disclosure, according to one embodiment, describes a laboratory vessel for storing and treating a tissue sample comprises a closable opening, and additionally comprises a pipe part which is insertable in the opening of the laboratory vessel, wherein in inserted position, the pipe part seals against the laboratory vessel with its outer circumference and is clampingly displaceable with respect to said laboratory vessel, wherein a pestle is mounted in the laboratory vessel, over which the pipe part can be placed sealingly with its inner circumference. The laboratory vessel also comprises one or more tissue sample treatment agents. The tissue sample and the treatment agents are separated by placing the pipe part over the pestle, which separates a treatment agent region from a sample region.

11 Claims, 3 Drawing Sheets

(52) U.S. Cl.
CPC ... *B01L 2300/046* (2013.01); *B01L 2300/047* (2013.01); *B01L 2400/0478* (2013.01)

(56) References Cited

FOREIGN PATENT DOCUMENTS

| | | |
|---|---|---|
| EP | 2333511 | 6/2011 |
| WO | 2015/176815 | 11/2015 |

OTHER PUBLICATIONS

PCT/EP2015/001025, International Search Report and Written Opinion dated Nov. 26, 2015, 1-8.

\* cited by examiner

SAMPLE CONTAINER WITH SEALING FUNCTION

RELATED APPLICATION

The present application claims priority to German Patent Application Serial No. 10 2014 007 410, filed May 22, 2014, the entire contents of which are incorporated herein by reference in their entirety.

DESCRIPTION

The invention, according to one embodiment, relates to a laboratory vessel for storing and treating a tissue sample with a closable opening, comprising a pipe part which is insertable through the opening of the laboratory vessel, wherein in inserted position, the pipe part seals against the laboratory vessel with its outer circumference and is clampingly displaceable with respect to said laboratory vessel. A laboratory vessel of the present disclosure is also described herein variously as a sample container.

Sample containers of the disclosure, according to one embodiment, are used particularly for the extraction of tissue samples from animal ears. In some embodiments, a sample container of the present disclosure, in addition to containing an extracted tissue sample (following extraction), can also comprise one or more preservatives and/or other substances which can treat or alter or change the extracted tissue sample. Additional agents used to treat an extracted tissue sample can be solids or liquids. Exemplary solids that can be used include hygroscopic powders or granules or hygroscopic molded bodies. Exemplary liquids that can be used for tissue treatment include one or more lysis buffer solutions.

The present disclosure also describes methods of processing of a tissue sample using a sample container as described herein. In one embodiment, for further processing of an extracted tissue sample, the tissue sample can be removed from the laboratory vessel or further treated directly in the laboratory vessel. A further processing in the laboratory vessel allows for particularly time-saving and simple laboratory processes. This leads to a significant saving of time and effort particularly for the automated further processing of the tissue sample. However, if the tissue sample is removed from the laboratory vessel, an additional process step is required, resulting in additional expenditure of time. Furthermore, a removal of the sample is associated with a considerable risk of contamination.

If tissue samples are further processed in a laboratory vessel of the present disclosure, any preservation agent or any agent/substance used for the initial extraction or preparation of the tissue can interfere with further downstream tissue processing methods. In laboratory vessels of the initially described type, molecular sieves are frequently used as treatment agents which are characterized by a strong adsorption capacity for gases, vapors, and solutes with specific molecular sizes. During further processing of the sample in the laboratory vessel, these molecular sieves clog, e.g. pipette tips or suck up added lysis buffers. In order to avoid such problems, the following solutions have been taken into consideration so far in the prior art:

In a first known method, only a little quantity of molecular sieve is used in order to prevent clogging of pipette tips or to prevent excessive adsorption of preparation substances. However, this leads to the molecular sieve frequently not being present in sufficient dosage in the laboratory vessel and the desired adsorption effect can only be achieved insufficiently.

According to a second, generally known method, the treatment agents are removed from the laboratory vessel prior to further processing of the tissue sample. This requires a time-consuming additional process step, and has the risk that, in addition to the removal of a treatment agent such as a preservation substance, the tissue sample can also be removed from the container. In addition, with this approach, there is a significant risk of contamination by contaminants and/or by released preservation substances.

The problem addressed by the present invention is that of providing an improved laboratory vessel that supports a simple and quick further processing of a tissue sample contained in the laboratory vessel.

This problem is solved by a laboratory vessel according to the invention which in one embodiment has features described in claim 1. Advantageous additional embodiments of the invention are described in the dependent claims.

According to one embodiment of the invention, a laboratory vessel for storing and treating a tissue sample comprises a closable opening, and additionally comprises a pipe part which is insertable in the opening of the laboratory vessel, wherein in inserted position, the pipe part seals against the laboratory vessel with its outer circumference and is clampingly displaceable with respect to said laboratory vessel, wherein a pestle is mounted in the laboratory vessel, over which the pipe part can be placed sealingly with its inner circumference.

A laboratory vessel, according to an embodiment of the invention, comprises a passage of the pipe part which is closed with a closure element. In some embodiments, the closure element closes the pipe part on the end which faces away from the pestle.

In some embodiments of a laboratory vessel according to the invention, the closure element is a stopper. In some embodiments of a laboratory vessel according to the invention, the closure element is designed so as to be puncturable.

In some embodiments of a laboratory vessel according to the invention, the pestle is mounted non-relocatably in the laboratory vessel. In some embodiments of a laboratory vessel according to the invention, the end of the pestle that faces in the direction of the opening of the laboratory vessel is arranged at a distance to the opening of the laboratory vessel.

In some embodiments, the laboratory vessel of the invention, comprises a treatment agent region (or treatment agent storage region) located between the inner wall of the laboratory vessel and the outer wall of the pestle, wherein at least one treatment agent is arranged (or stored or located).

In some embodiments, the laboratory vessel of the disclosure comprises a punch disposed above the laboratory vessel. In some embodiments, the punch is designed in a sleeve-like manner, with which the pipe part can be displaced into within the laboratory vessel.

In a laboratory vessel according to one embodiment of the invention, a tissue sample can be further processed easily and quickly. The laboratory vessel according to one embodiment of the invention particularly ensures an effective separation of the tissue sample from the treatment agents contained in the laboratory vessel, such as for example preservation substances and lysis buffers.

The tissue sample and the treatment agents are separated by placing the pipe part over the pestle, which separates a treatment agent region from a sample region. Preferably, this results in a hermetic separation. After the separation, the tissue sample can be removed, manipulated with the aid of known laboratory instruments, such as pipettes or tweezers, and/or treated within the laboratory vessel with further substances without the interference of any tissue preparation agent(s).

Due to the simple and quick option of separating treatment agent and tissue sample, the invention has proven particularly advantageous for automated further processing of tissue samples.

Due to the design of the laboratory vessel according to the invention, the tissue sample can be arranged in a region between the opening of the laboratory vessel and the free end of the pestle which faces the pipe part within the laboratory vessel. Preferably, the tissue sample is situated within the pipe part or between the end of the pipe part which faces the pestle and the free end of the pestle.

The pipe part, for example, according to one embodiment, can be designed as a pipe knife with a circular cutter, wherein the circular cutter is arranged on the end of the pipe part which faces the pestle. The pipe part, for example, according to another embodiment, can be a part of a punch instrument which punches a tissue sample from an ear during attachment of an ear tag to the animal ear and is thereby or subsequently inserted, together with the tissue sample, in a laboratory vessel. In this case, the interior of the pipe part, delimited by its wall, forms at least a part of the sample region.

For the separation of the sample region from the treatment agent region, a sealing is provided between the outer circumference of the preferably cylindrically designed pipe part and the inner wall of the laboratory vessel. It is understood that the pipe part can have different geometries, provided that the sealing according to the invention is ensured between the outer circumference of the pipe part and the inner wall of the laboratory vessel.

The sealing between the outer circumference of the pipe part and the inner wall of the laboratory vessel is provided such that the sealing is effected over the entire outer surface of the pipe part. This sealing can be achieved in that the pipe part bears planarly against the inner wall of the laboratory vessel with its entire outer circumferential surface. Alternatively, it is also possible for the pipe part to bear against the inner wall of the laboratory vessel with only a few regions of its outer circumferential surface, for example in the manner of a ring seal. It is also conceivable that, for a sealing between the pipe part and the laboratory vessel, sealing regions are provided on the outer circumference of the pipe part which are, for example, arranged in different regions of the outer circumference of the pipe part, provided that a sealing is achieved over the entire circumference, i.e. over an entire turn.

The sealing can be particularly designed such that the passage of liquids and solids is blocked along a region of the inner wall of the laboratory vessel or after placing over the pestle along a region of the circumferential surface of the pestle. For pressure compensation during the placing of the pipe part over the pestle, the sealing can be designed so as to be gas-permeable at least in sections.

As mentioned above, the sample region is separated from the treatment agent region by placing the pipe part over the pestle. Treatment agents located between the pipe part and the bottom of the laboratory vessel are delimited from the sample region located above the free end of the pestle by the placing of the pipe part over the pestle. The pipe part thus closes a treatment agent region located in the bottom region of the container or in a region around the pestle. After the separation of the treatment agent region from the sample region, the sample can be further processed without interfering treatment agents or removed from the sample vessel.

As mentioned above, the sealing between pipe part and wall of the laboratory vessel and/or the sealing between the pipe part and the circumference of the pestle can be particularly designed such that the passage of liquids and solids is blocked. For pressure compensation during the placing of the pipe part over the pestle, at least one of the sealings can be designed so as to be gas-permeable at least in sections. An unwanted pressure buildup, which, e.g. unfolds an elastic effect, could occur during the placing of the pipe part over the pestle, i.e. when the sample region is separated from the treatment agent region.

In a simple embodiment, the pestle can be designed so as to be cylindrical. In any case, the circumferential contour of the pestle is designed so as to be complimentary to the contour of the inner circumference of the pipe part. In particular, the pestle and/or the pipe part are designed such that the pestle at its circumference seals entirely against the inner wall of the pipe part. In particular, the upper end of the pestle which faces the pipe part is blunt, wherein the blunt end has particularly a plane aligned perpendicularly to the longitudinal axis of the pipe part. This facilitates the insertion of the sample in the pipe part. The edge region of the upper end can be particularly beveled continuously, thus facilitating the placing of the pipe part over the upper end of the pestle.

The mounting of the pestle within the laboratory vessel can be provided such that the pestle is connected to the laboratory vessel with the end facing the bottom of the laboratory vessel. This connection can be designed as one piece with the laboratory vessel, i.e. the pestle can be molded to the laboratory vessel. The pestle can also be adhered to the bottom of the laboratory vessel by means of an adhesive, or it can be welded to the bottom. Due to the immobilization of the pestle on the bottom of the laboratory vessel, a support of the pestle against the inner wall of the laboratory vessel can be foregone.

Alternative to a fastening of the pestle in the bottom region of the laboratory vessel, it is also conceivable that the pestle is mounted particularly centered in the laboratory vessel. For such purpose, spacer means can be provided which, for example, are arranged on the outer circumference of the pestle and support the pestle against the inner wall of the laboratory vessel. With this design, it is practical if at least two or three spacers are arranged at the sides of the pestle. In particular, these spacers can be arranged on the pestle evenly distributed in at least one row in circumferential direction. Preferably for such purpose, struts can be used which extend at least in sections, particularly in longitudinal direction along the circumference on the pestle. It is possible that such spacers are displaced in the laboratory vessel or severed from the pestle when the pipe part is placed over the pestle.

The placing of the pipe part over the pestle can, for example, be effected by a piston-like or sleeve-like punch which is inserted in the laboratory vessel through the opening and applies shift force to the edge region of the pipe part which faces the opening of the laboratory vessel by resting on said edge region.

In a preferred embodiment of the invention, the passage of the pipe part is closed with a closure element. The passage, i.e. the hollow space which is encased by the wall of the pipe part and open on both ends of the pipe part, is in this embodiment interrupted by a closure element. The closure element can be arranged within the pipe part particularly in a plane perpendicular to the longitudinal axis of the pipe part. Particularly preferably, the closure element closes the pipe part on the end facing away from the pestle.

A closure on the pipe part can be designed, e.g. as a foil. The foil—closing the passage of the pipe part—can be placed on the edge of the pipe part which faces the opening of the laboratory vessel and attached in said position by means of an adhesive, welding, or the like. The closure of the pipe part can also be designed as one piece with the pipe part.

Additionally or alternatively, the pipe part as well as or only the laboratory vessel is closable with a lid. Conceivable, for example, is a lid which is placed on the edge of the laboratory vessel in the region of its opening and can be fastened in such position, for example, by means of a catch mechanism. For the closing of the laboratory vessel—as already described with regard to the pipe part—a foil can be used which is placed on the edge of the laboratory vessel, covering the opening of the vessel, and, e.g. fastened in such position by means of an adhesive, welding, or the like.

In a further preferred embodiment of the invention, the closure element is a stopper. The stopper can be particularly designed such that is clampingly secured in a passage of the pipe part. This design allows, for example, for easy access to the tissue sample by removing the stopper from the pipe part, thus creating access to the inside of the laboratory vessel.

Preferably, the closure element is designed so as to be puncturable. Particularly, the intention is that the closure element breaks open at least in sections when a compressive load is applied. When the closure breaks open, the sample region is opened outwardly.

A compressive load or application of force can be effected, for example, when the pipe part is placed over the pestle. If a tissue sample is located between the free end of the pestle and the closure of the pipe part, the pestle presses against the tissue sample when the pipe part is placed over the pestle and squeezes the tissue sample against the closure of the pipe part. Eventually, the pestle pushes the tissue sample through the closure which breaks open under such application of force. The puncturing of the closed end of the pipe part can also be effected by pushing with a tool which is guided to the pipe part through the opening of the laboratory vessel.

The intention with this embodiment is that the material of the closure element is thin relative to the wall of the pipe part. This facilitates the puncturing and prevents a tearing of wall regions of the pipe part during puncturing.

In one embodiment, the closed end of the pipe part can have predetermined breaking lines which—as described—are breakable or puncturable in case of an application of force. If the pipe part is closed with a stopper, the stopper can be simply expelled from the passage of the pipe part by means of the free end of the pestle due to the placing the pipe part over the pestle.

According to a preferred structural embodiment, the pestle is mounted non-relocatably in the laboratory vessel. Preferably, the lower end of the pestle which faces the bottom of the laboratory vessel bears against the bottom of the laboratory vessel or is arranged at a fixed distance from said bottom. This is advantageous because the pestle cannot fall out of the laboratory vessel and no treatment agent can accumulate below the pestle, i.e. between the bottom of the laboratory vessel and the end of the pestle which faces the bottom of the laboratory vessel. When the pestle is pushed into the laboratory vessel, treatment agents accumulated below the pestle might block the pestle and obstruct the mechanism according to the invention.

In one embodiment the end of the pestle which faces the opening of the laboratory vessel is arranged at a distance to the opening of the laboratory vessel. It is intended that the distance between the end of the laboratory vessel which forms the opening and the end of the pestle which faces the opening corresponds to at least one length of the pipe part. The distance allows for an insertion of the pipe part with the sample without the sample or the pipe part making contact with the pestle during insertion. Particularly, it is possible that a distance is maintained between the pestle and the end of the pipe part which faces the pestle when the pipe part is completely inserted. The sample can therefore be held in the upper region of the laboratory vessel and is simultaneously sufficiently exposed with regard to treatment agents contained in the container. The treatment agents can thus take effect on the sample in an unimpeded manner.

Preferably, the laboratory vessel and/or the pipe part are produced with an injection molding method. This allows for simple, cost-effective and quick manufacturing of the laboratory vessel. One embodiment provides for the laboratory vessel and/or at least some of the parts of the laboratory vessel to be made of a plastic or contain a plastic. It is preferably intended that the pipe part contains a plastic. In particular, the materials of the laboratory vessel and/or its parts are suitable for medical purposes.

The invention is explained in detail by the drawings.

Figure 1A:
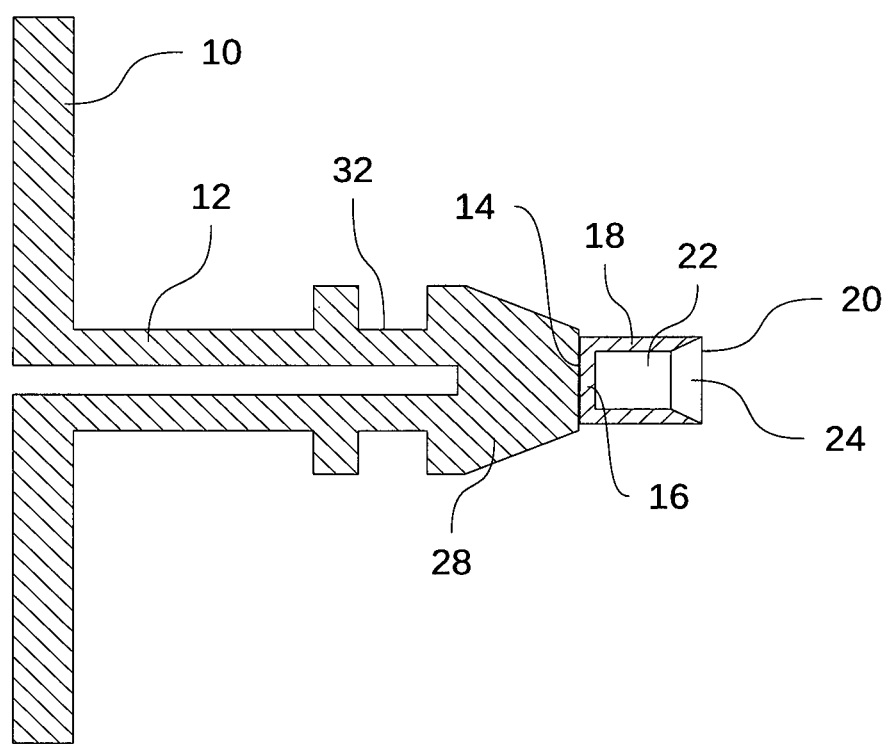
FIG. 1a shows a cross-sectional view of a part of an ear tag prior to punching.

FIG. 1a shows a cross-sectional view of one of two parts of an ear tag, specifically a spike plate 10, having a spike 12 attached to it, which at its tip is detachably connected to a pipe part 18 by means of a separation surface 14 having, e.g. an adhesive. The tip of the spike 12 is designed to be on its spike head 28. In this embodiment, the pipe part 18 is designed as a pipe knife with a circular cutter 20. The circular cutter 20 is arranged on the edge of the pipe part 18 which faces away from the spike head 28. Opposite of the circular cutter 20, the pipe part 18 is closed with a closure element 16 designed in this case as closure wall. In this case, the closure element 16 is connected as one piece with the pipe part 18. As shown in FIG. 1a, a chamber 22, which is delimited by its wall, is formed within the pipe part 18, said chamber 22 being used, e.g. for receiving and retaining a tissue sample 38. The chamber 22 is enclosed by the outer wall of the pipe part 18 and is open in the region of the circular cutter 20. The circular cutter 20 thus forms a mouth 24, through which the chamber is accessible from outside.

Figure 1B:
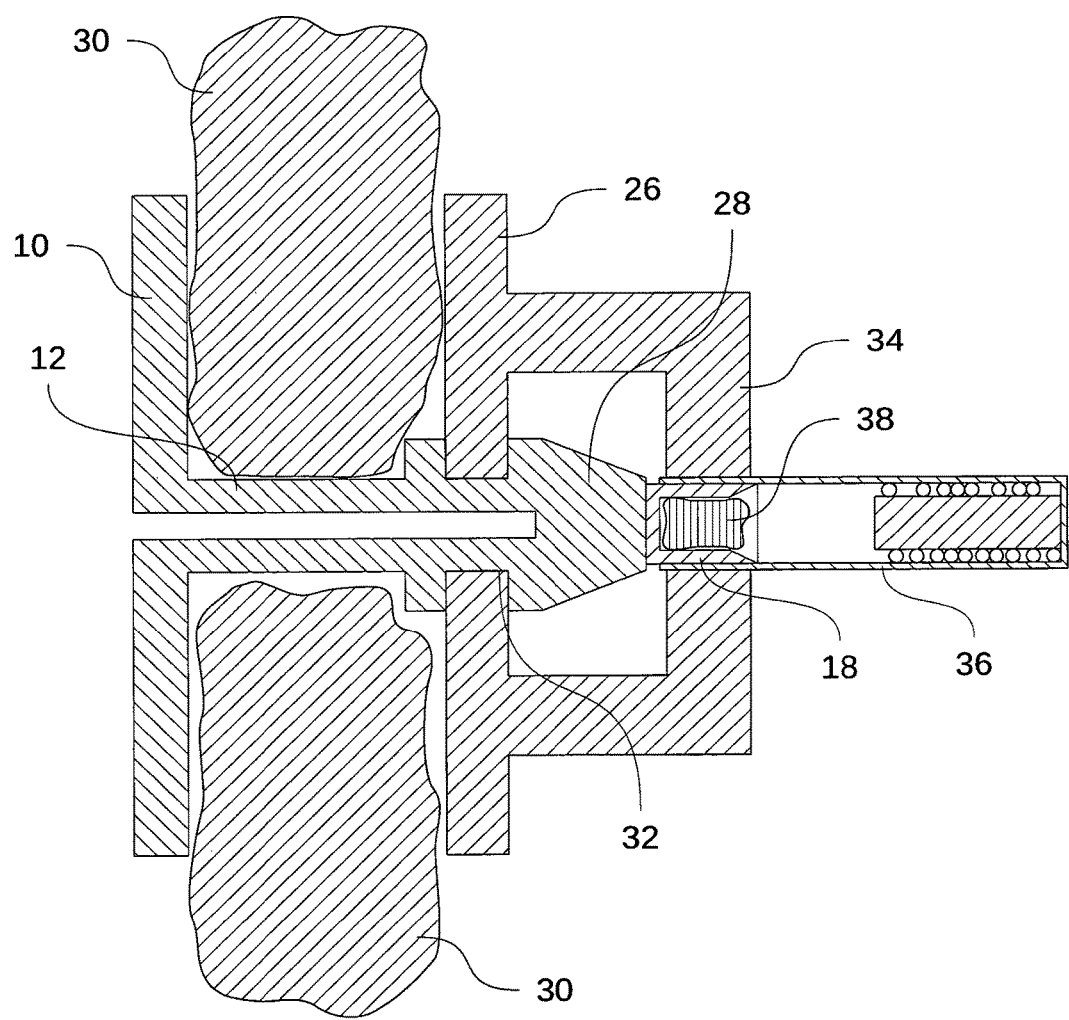
FIG. 1b shows a cross-sectional view of an ear tag completely attached to the ear with a laboratory vessel according to the invention.

FIG. 1b shows the arrangement according to FIG. 1a, after punching, attached to an ear 30. The ear tag part of FIG. 1a with the spike plate 10 and the spike 12 is connected to a second ear tag part, comprising a perforated plate 26 and a holder 34 arranged with the perforated plate.

As shown in FIG. 1b, the spike 12 is punched through the ear with its spike head 28 which carries the pipe part 18 and inserted through the perforated plate 26. As is shown in FIG. 1b, the perforated plate 26 is engaged in an annular groove 32 in the spike head 28. As a result, the plates 10 and 26 are securely connected to one another and to the ear 30.

At the punch point, the holder 34 is attached to the side of the perforated plate 26 which faces away from the spike plate 10, said holder 34 holding a laboratory vessel 36 according to the invention. As shown in FIG. 1b, during punching, the pipe part 18 was inserted in the laboratory vessel 36 and closes said vessel in the manner of a stopper. In this closed position, the container 36 can be detached from the holder 34, and the pipe part 18 can be detached from the spike head 28.

During punching, a sample 38 accumulated in the chamber 22 and which was formed by punching the ear 30 by means of the circular cutter 20. This sample can be further processed in the laboratory and particularly within the laboratory vessel. A design of the laboratory vessel 36 according to the invention is shown in five operating positions in FIGS. 2a through 2e.

Figure 2A:
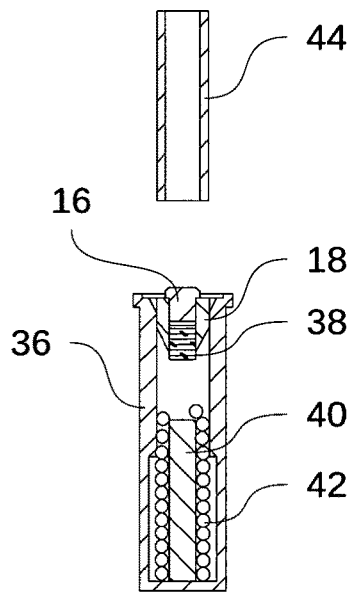
FIGS. 2a-2e show cross-sectional views of the container according to the invention in different operating positions.

FIG. 2a shows the laboratory vessel 36 according to the invention in an operating position, in which the pipe part 18—as in FIG. 1a—is inserted through the opening of the laboratory vessel 36 into said vessel's interior. In this design, the pipe part 18 is closed with a closure element 16 which is designed as stopper. The tissue sample 38 is held approximately centrally from the wall of the pipe part 18.

As can be seen when comparing FIGS. 2a through 2e, the pipe part 18 is displaceably mounted within the laboratory vessel 36. Furthermore, the pipe part 18 is designed so as to be sealing on its outer circumference with regard to the inner wall of the laboratory vessel 36. A rod-like pestle 40 is supported with a first end by the bottom of the laboratory vessel 36 and with its other end, which protrudes approximately axially into the interior of the laboratory vessel 36, is aligned to the pipe part 18. In a treatment agent region located between the inner wall of the laboratory vessel 36 and the outer wall of the pestle 40, a treatment agent 42 is arranged. One or more treatment agents 42 can be located here. Above the laboratory vessel 36, a punch 44 designed in a sleeve-like manner is shown, with which the pipe part 18 can be displaced within the laboratory vessel 36.

Figure 2B:
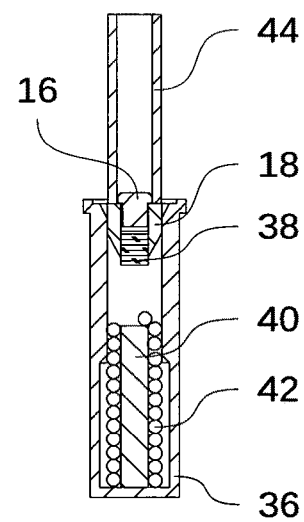
Figure 2C:
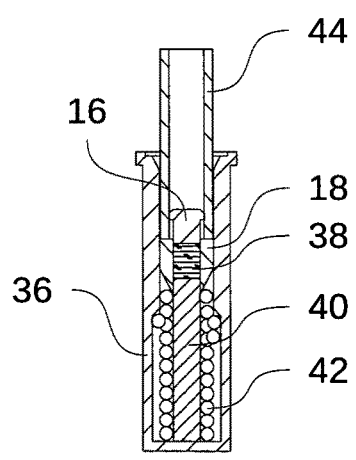

FIG. 2b shows the laboratory vessel 36 from FIG. 2a in a second operating position, in which the punch 44 is placed over the edge of the pipe part 18 which faces away from the pestle 40. FIG. 2c shows the laboratory vessel 36 from FIG. 2a in a next operating position, in which the punch 44 is inserted in the laboratory vessel 36. Through application of force by means of the punch 44, the pipe part 18 is displaced within the laboratory vessel 36 in the direction of the pestle 40 and placed over it. As can be seen, the pestle 40 pushes against the tissue sample 38 and squeezes it against the closure element 16 designed as stopper. In this operating position, the stopper 16 is already pushed out, for the most part, from the pipe part 18 by the application of force of the pestle 40 and the tissue sample 38. It is understood that in this embodiment of the laboratory vessel 36, the punch 44 has on its end which faces the pipe part 18 a receiving bore or the like, into which the closure element 16 and the tissue sample 38 can plunge when the pipe part 18 is punctured.

Figure 2D:
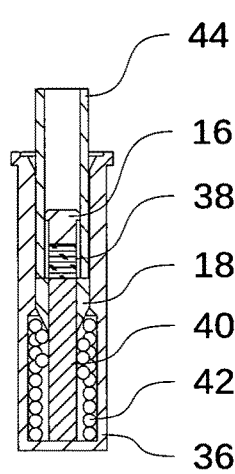
Figure 2E:
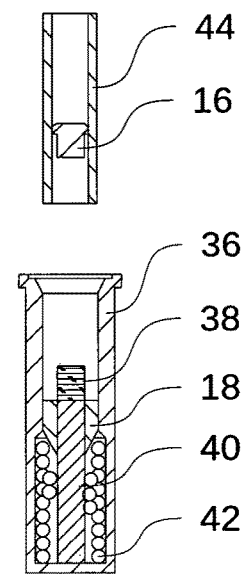

FIG. 2d shows the laboratory vessel 36 from FIG. 2a in a fourth operating position. Due to a further displacement of the punch 44 in the direction of the bottom of the laboratory vessel 36, the pipe part 18 is completely placed over the pestle 40. The pestle 40 has pushed the tissue sample 38 entirely through the pipe part 18. It can also be seen that the closure element 16 is completely removed from the pipe part 18. The region enclosing the tissue sample 38 is completely separated from the region enclosing the treatment agent 42. As can be seen in FIGS. 2c-2e, the tissue sample 38 is no longer enclosed by the treatment agent 42 or enclosed by only few parts of the treatment agent 42 after the pipe part 18 is placed over the pestle 40.

FIG. 2e shows the laboratory vessel 36 from FIG. 2a in a fifth operating position. It shows that the punch 44 was removed from the laboratory vessel 36, wherein the closure element 16, carried by the punch 44, was also removed from the laboratory vessel 36. It can be provided for the closure element 16 to be retained in a receptacle of the punch 44, for example by means of a catch mechanism or the like, when the pipe part 18 is displaced into the laboratory vessel 36. Instead of a catch mechanism, it is also possible that the closure element 16 is clampingly retained at its circumferential region, for example at its upper edge, in a receptacle of the punch 44.

In a modified design of the closure element 16, the closure element 16 is not removed from the laboratory vessel 36 by the punch 44 after the pipe part 18 is placed over the pestle 40 but, together with the tissue sample 38, remains within the laboratory vessel 36.

Taking into account the sealing function between pipe part 18, pestle 40, and inner wall of the laboratory vessel 36, it can be provided for all embodiments that at least one part of the chamber 22 of the pipe part 18 has an inner diameter that is greater than the outer diameter of the pestle 40. In this embodiment, the sealing between the pipe part 18 and the outer wall of the pestle 40 can be provided on the edge region of the pipe part 18 which faces the opening of the laboratory vessel 36. For that purpose, the edge of the pipe part 18 which faces the opening of the laboratory vessel 36 has a radially inwardly directed ring bead which seals with the pestle 40 when the pipe part 18 is placed over the pestle 40.

In FIGS. 1a and 1b, the circular cutter 20 is formed by an inwardly directed bevel of the wall of the pipe part 18, whereas the outer wall of the pipe part 18 runs axially parallel in the region of the circular cutter 20. In an alternative embodiment—as in FIGS. 2a to 2e—the edge region of the pipe part 18 which faces the pestle 40 for forming a circular cutter is beveled only at the outer circumference of the pipe part. Here, the inner wall of the pipe part 18 runs axially parallel in the region of the circular cutter. Alternatively, it is easily also conceivable that an edge of the pipe part 18 for forming a circular cutter is beveled inwardly as well as outwardly.

The present disclosure describes methods for using one or more embodiments of the laboratory vessel of the invention, as variously described above, to extract a tissue sample (38), wherein the extracted tissue sample (38) is at least initially not in contact with the one or more treatment agents (42).

A method of the present invention, further comprises processing the extracted tissue sample (38), wherein the extracted tissue sample (38) is brought in contact with one or more treatment agent (42) located in the treatment agent location region.

LIST OF REFERENCE SIGNS

10 Spike plate
12 Spike
14 Separation surface
16 Closure element
18 Pipe part
20 Circular cutter
22 Chamber
24 Mouth
26 Perforated plate
28 Spike head
30 Ear
32 Annular groove
34 Holder
36 Laboratory vessel 38 Tissue sample
40 Pestle
42 Treatment agent
44 Punch

I claim:

1. A laboratory vessel for storing and treating a tissue sample (38), with a closable opening, comprising
a pipe part (18), which is insertable through the opening of the laboratory vessel, wherein in inserted position, it seals against the laboratory vessel with its outer circumference and is clampingly displaceable with respect to said laboratory vessel (36), characterized by
a pestle (40) mounted in the laboratory vessel, the vessel further comprising a treatment agent region located between the inner wall of the laboratory vessel (36) and the outer wall of the pestle (40), wherein at least one treatment agent 42 is arranged wherein the pipe part (18) is sealingly placed with its inner circumference over the pestle (40) thereby separating the treatment agent region from a sample region within the laboratory vessel.

2. The laboratory vessel according to claim 1, characterized in that the passage of the pipe part (18) is closed with a closure element (16).

3. The laboratory vessel according to claim 2, characterized in that the closure element (16) closes the pipe part (18) on the end which faces away from the pestle (40).

4. The laboratory vessel according to claim 3, characterized in that the closure element (16) is a stopper.

5. The laboratory vessel according to claim 4, characterized in that the closure element (16) is designed so as to be puncturable.

6. The laboratory vessel according to claim 4, characterized in that the pestle (40) is mounted non-relocatably in the laboratory vessel.

7. The laboratory vessel according to claim 6, characterized in that the end of the pestle (40) that faces in the direction of the opening of the laboratory vessel is arranged at a distance to the opening of the laboratory vessel.

8. The laboratory vessel of claim 1, wherein a punch (44) is disposed above the laboratory vessel 36.

9. The laboratory vessel of claim 8, wherein the punch (44) is designed in a sleeve-like manner, with which the pipe part (18) can be displaced within the laboratory vessel (36).

10. A method for using the laboratory vessel of claim 1 to extract a tissue sample (38), wherein the extracted tissue sample (38) is at least initially not in contact with the one or more treatment agents (42).

11. The method of claim 10, further comprising processing the extracted tissue sample (38), wherein the extracted tissue sample (38) is brought in contact with one or more treatment agent (42).

* * * * *